(12) United States Patent
Obasanjo et al.

(10) Patent No.: US 9,183,361 B2
(45) Date of Patent: Nov. 10, 2015

(54) RESOURCE ACCESS AUTHORIZATION

(75) Inventors: Oludare V. Obasanjo, Renton, WA (US); Stephen R. Gordon, Woodinville, WA (US); Aleksandr Radutskiy, Redmond, WA (US); Philip J. Hallin, Redmond, WA (US); Atanas D. Oskov, Kenmore, WA (US); Jeremy D. Viegas, Redmond, WA (US); Daniel C. Kitchener, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/230,460

(22) Filed: Sep. 12, 2011

(65) Prior Publication Data

US 2013/0067568 A1    Mar. 14, 2013

(51) Int. Cl.
*G06F 7/04* (2006.01)
*G06F 12/00* (2006.01)
*G06F 12/14* (2006.01)
*G06F 13/00* (2006.01)
*G06F 17/30* (2006.01)
*G06F 21/31* (2013.01)
*H04L 29/06* (2006.01)
*G06F 21/62* (2013.01)

(52) U.S. Cl.
CPC ............ *G06F 21/31* (2013.01); *G06F 21/6218* (2013.01); *H04L 63/0807* (2013.01); *H04L 63/101* (2013.01)

(58) Field of Classification Search
None
See application file for complete search history.

(56) References Cited

U.S. PATENT DOCUMENTS

| 5,805,803 | A  | * | 9/1998  | Birrell et al. ................... 726/12 |
| 5,889,952 | A  |   | 3/1999  | Hunnicutt et al. |
| 6,205,480 | B1 |   | 3/2001  | Broadhurst et al. |
| 6,275,944 | B1 |   | 8/2001  | Kao et al. |
| 7,150,038 | B1 |   | 12/2006 | Samar |
| 7,174,383 | B1 |   | 2/2007  | Biswas et al. |
| 7,305,701 | B2 |   | 12/2007 | Brezak et al. |
| 7,657,639 | B2 |   | 2/2010  | Hinton |
| 8,312,272 | B1 | * | 11/2012 | Serenyi et al. ................ 713/168 |

(Continued)

FOREIGN PATENT DOCUMENTS

| CN | 1478223   | 2/2004  |
| CN | 101331735 | 12/2008 |

(Continued)

OTHER PUBLICATIONS

Arvind et al. (Arvind Kumar Giri and Sharad Srivastava, "Single Sign-on for non Flash multiple applications across heterogeneous platforms", Adobe System Inc., 2010) http://ip.com/IPCOM/000206520.*

(Continued)

*Primary Examiner* — Andrew Nalven
*Assistant Examiner* — Quy Pham
(74) *Attorney, Agent, or Firm* — Timothy Churna; Kate Drakos; Micky Minhas

(57) ABSTRACT

Techniques for resource access authorization are described. In one or more implementations, an application identifier is used to control access to user resources by an application. A determination is made whether to allow the application to access the user resources by comparing an application identifier received from an authorization service with a system application identifier for the application obtained from a computing device on which the application is executing.

20 Claims, 8 Drawing Sheets

(56) References Cited

U.S. PATENT DOCUMENTS

| | | | |
|---|---|---|---|
| 2002/0165960 A1 | 11/2002 | Chan | |
| 2003/0149781 A1 | 8/2003 | Yared et al. | |
| 2005/0015490 A1* | 1/2005 | Saare et al. | 709/225 |
| 2005/0188360 A1 | 8/2005 | De Jong | |
| 2007/0083501 A1 | 4/2007 | Pedersen et al. | |
| 2007/0083750 A1 | 4/2007 | Miura et al. | |
| 2007/0118890 A1 | 5/2007 | Song | |
| 2007/0186112 A1* | 8/2007 | Perlin et al. | 713/182 |
| 2008/0046983 A1 | 2/2008 | Lester et al. | |
| 2008/0059804 A1 | 3/2008 | Shah et al. | |
| 2008/0072301 A1 | 3/2008 | Chia et al. | |
| 2008/0134305 A1 | 6/2008 | Hinton et al. | |
| 2009/0249439 A1 | 10/2009 | Olden et al. | |
| 2009/0292927 A1 | 11/2009 | Wenzel et al. | |
| 2010/0064234 A1 | 3/2010 | Schreiber et al. | |
| 2010/0115114 A1 | 5/2010 | Headley et al. | |
| 2010/0229224 A1 | 9/2010 | Etchegoyen | |
| 2010/0257578 A1 | 10/2010 | Shukla et al. | |
| 2011/0067095 A1 | 3/2011 | Leicher et al. | |
| 2011/0078770 A1 | 3/2011 | Nash et al. | |
| 2011/0258690 A1* | 10/2011 | Gaffan et al. | 726/9 |
| 2012/0054841 A1* | 3/2012 | Schultz et al. | 726/6 |
| 2012/0214444 A1* | 8/2012 | McBride et al. | 455/411 |
| 2012/0227098 A1 | 9/2012 | Obasanjo et al. | |
| 2013/0024919 A1 | 1/2013 | Wetter et al. | |
| 2013/0067568 A1* | 3/2013 | Obasanjo et al. | 726/20 |

FOREIGN PATENT DOCUMENTS

| | | |
|---|---|---|
| WO | WO-2005008456 | 1/2005 |
| WO | WO-2006004815 | 1/2006 |
| WO | WO-2010092138 | 8/2010 |

OTHER PUBLICATIONS

Erica Sadun (NPL "Dev Juice: Help me generate unique identifier") http://www.tuaw.com/2011/08/21/dev-juice-help-me-generate-unique-identifiers/.*

NPL "The OAuth 2.0 Authentication Protocol—Accounts 1.0 documentation", 2009, http://hdknr.bitbucket.org/accounts/oauth.html.*

Kevin Lloyd, "CakePHP Auth Component", 2008, http://www.webdevelopment2.com/cakephp-auth-component-tutorial-3/.*

Andreas Vallen, "Persistent cookie, remember me checkbox", 2010, https://java.net/projects/opensso/lists/users/archive/2010-06/message/217.*

"Aegis Single Sign-On Appliance", retrieved from <http://www.aegisusa.com/identity_management_solutions/appliance_point/single_sign_on.php> on Dec. 15, 2010, 2 pages.

"Authentication in the Cloud", *Likewise Blog*, retrieved from <http://www.likewise.com/blog/?p=371> on Apr. 4, 2011,(Aug. 2, 2010), 4 pages.

"Claims Based Identity & Access Control Guide", *Microsoft Patterns & Practices*, retrieved from <http://claimsid.codeplex.com/wikipage?title=Ciaims-Based%20Single%20Sign-On%20for%20the%20Web> on Apr. 4, 2011, 10 pages.

"Identity Manager and the Single Sign-on Service", *MSDN*, retrieved from <http://msdn.microsoft.com/en-us/ library/bb972911.aspx> on Apr. 4, 2011, 3 pages.

"Single Sign on at the University", *University of Exeter*, retrieved from <http://as.exeter.ac.uk/iUsystems/singlesignon/> on Nov. 7, 2011, 2 pages.

"Single Sign-On in SharePoint Portal Server", available at <http://office.microsoft.com/download/afile.aspx?AssetID=AM102437461033>,(Jun. 9, 2004), 26 pages.

"TriCipher Offers Cloud Single Sign-On and Federated Access for the Enterprise", retrieved from <http://www. digitaljournal.com/pr/55093> on Dec. 15, 2010, 3 pages.

"Trusted Application Authentication (Glossary Entry)", retrieved from <http://confluence.atlassian.com/display/GADGETDEV/Trusted+Application+Authentication+(Giossary+Entry)> on Apr. 4, 2011,1 page.

Buecher, Axel et al., "Federated Identity and Trust Management", available at <http://www.redbooks.ibm.com/ redpapers/pdfs/redp3678.pdf>,(2008),pp. 1-24.

Tseng, Erick "The Facebook Blog", retrieved from <http://blog.facebook.com/blog.php?post=446167297130> on Dec. 15, 2010,(Nov. 4, 2010),5 pages.

Zonka, "Login Prompts for Document Link after Authentication", retrieved from <http://www.eggheadcafe.com/software/aspneU30350825/login-prompts-for-document-link-after-authentication.aspx> on Apr. 4, 2011,(Jul. 16, 2007),4 pages.

"Authentication", Retrieved at <<http://developers.facebook.com/docs/authentication/>>, Retrieved Date: Jul. 14, 2011, pp. 8.

Obasanjo, Dare, "Windows Live developer platform adds OAuth 2.0 and more, continuing to let users connect the devices, apps, and sites they choose", Retrieved at <<http://windowsteamblog.com/windows_live/b/windowslive/archive/2011/06/14/windows-live-developer-platform-adds-oauth-2-0-and-more-continuing-to-let-users-connect-the-devices-apps-and-sites-they-choose.aspx>>, Jun. 14, 2011, pp. 12.

"Open ID Connect", Retrieved at <<http://openidconnect.com/>>, Retrieved Date: Jul. 14, 2011, pp. 7.

"International Search Report", Mailed Date: Dec. 14, 2012, Application No. PCT/US2012/054387, Filed Date: Sep. 10, 2012, pp. 9.

"Final Office Action", U.S. Appl. No. 13/039,469, (Mar. 26, 2013),15 pages.

"International Search Report and Written Opinion", Application No. PCT/US2012/027544, (Jul. 27, 2012), 9 pages.

"Non-Final Office Action", U.S. Appl. No. 13/039,469, Sep. 25, 2014, 15 pages.

"Foreign Office Action", CN Application No. 201210335896.X, Nov. 3, 2014, 22 Pages.

"Extended European Search Report", EP Application No. 12752440.3, Jan. 9, 2015, 6 pages.

Hardt,"The OAuth 2.0 Authorization Protocol", Version 2.16—https://tools.ietf.org/pdf/draft-ietf-oauth-v2-16.pdf, May 19, 2011, 37 pages.

"Final Office Action", U.S. Appl. No. 13/039,469, Apr. 1, 2015, 14 page.

"Extended European Search Report", EP Application No. 12831989.4, Mar. 25, 2015, 8 pages.

Hammer-Lahav, "The OAuth 2.0 Authorization Protocol Draft-ietf-oauth-v2-21.txt", Available at: https://tools.ietf.org/html/draft-ietf-oauth-v2-21, Sep. 5, 2011, 43 pages.

"Foreign Office Action", CN Application No. 201210335896.X, Aug. 28, 2015, 7 pages.

* cited by examiner

RESOURCE ACCESS AUTHORIZATION

BACKGROUND

Today's computer user has access to a wide variety of applications, such as media services, web applications, social media applications, and so on. Many of these applications use some type of identification technique to ascertain a user's identity and gain access to user information, such as an online authentication and/or authorization service. A primary challenge in utilizing such techniques is enabling an application to be authorized to access user resources while ensuring that the user's identity is protected.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for resource access authorization are described. In one or more implementations, an application identifier is used to control access to user resources by an application. A determination is made whether to allow the application to access the user resources by comparing an application identifier received from an authorization service with a system application identifier for the application obtained from a computing device on which the application is executing.

In one or more implementations, a reply is received from an authorization entity in response to a request seeking to determine whether or not an application is permitted access to user resources, the reply including an application identifier for the application. The application is allowed to access the user resources if the application identifier matches a system application identifier for the application obtained from a computing device on which the application is executing.

In one or more implementations, techniques detect that an application executing on a computing device is requesting access to user resources via a persisted authentication mode. A determination is made whether an application identifier received from an authorization service matches a system application identifier obtained from the computing device. If the application identifier matches the system application identifier, the application is allowed to access the user resources via authentication data received from the authorization service.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
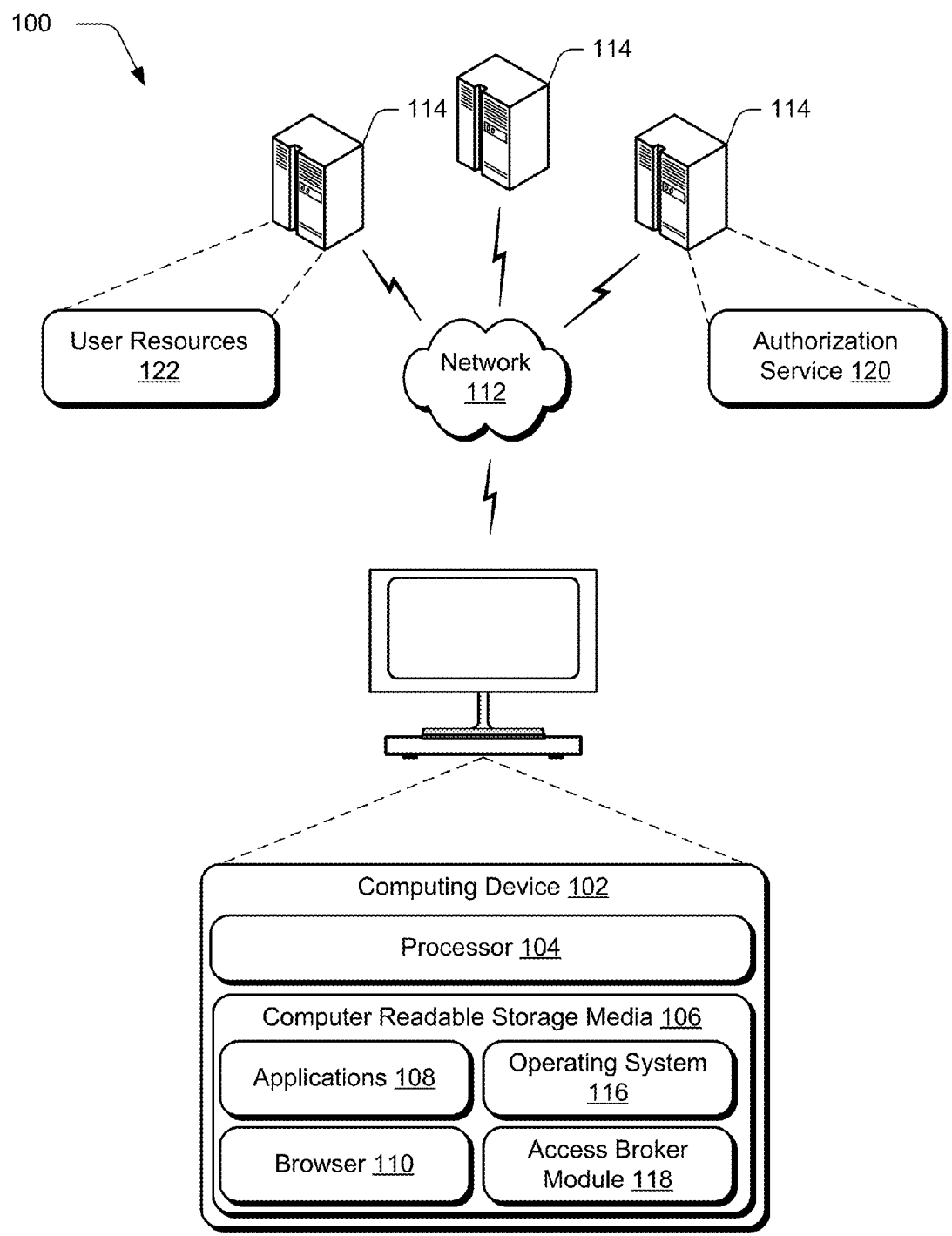
FIG. 1 is an illustration of an environment in an example implementation that is operable to employ techniques discussed herein.

Techniques for resource access authorization are described. In one or more implementations, the techniques may be employed to authorize an application to access user resources while protecting user credentials, such as a user name and/or a password, from unauthorized entities. For instance, an access broker can be utilized that acts as an intermediary between an application that is requesting access to user resources and an authorization entity that can confirm a user's identity and enable access to the user resources. Examples of user resources include user content (e.g., images, audio, video, and so on), user data (e.g., files), user profiles for applications and/or services, and so on.

In implementations, the access broker enables an application to be authorized by an authorization entity to allow the application to access user resources. For example, an application can invoke the access broker, which communicates with the authorization entity to cause a user interface associated with the authorization entity to be presented. A user can provide authentication information to the user interface, such as a username and password. If the username and password match a user profile known by the authorization entity, the authorization entity returns authorization information to the access broker. In implementations, an authorization prompt can be presented to the user that enables the user to provide authorization for the application to access the user resources. The access broker can enable the application to access the user resources via the authorization information.

Further to embodiments, a persisted authentication mode can be utilized that enables an application to access user resources during multiple separate transactions without requiring a user to provide authentication information for each transaction. For example, when a user provides authentication information to an authorization service to enable an application to access user resources, the application and/or the user can request the persisted authentication mode. The authentication information, along with other information, can be cached (e.g., by the access broker) as part of a cached authentication state for the application.

When the application requests access to user resources during a subsequent transaction, the access broker forwards the request along with the cached authentication state to the authorization service. The authorization service ascertains based on the cached authentication state that the application was previously authorized by a user to access user resources, and returns an access token and an application identifier for the application to the access broker. In implementations, the authorization service can request user authorization (e.g., via an authorization prompt) prior to returning the indication of authorization to the access broker.

The access broker checks to see if the application identifier received from the authorization service matches a system-level identifier for the application provided by a computing device on which the application is running. If the identifiers match, the access broker provides the access token to the application. The application can use the access token to access user resources. If the identifiers do not match, the application may be denied access to the resources and/or a user may be prompted to provide authentication information to allow the application to access the user resources.

As used herein, the term "authorization" refers generally to techniques for enabling applications and other entities to access resources, and is not limited to particular protocols, procedures, conventions, or standards. Thus, the term is to be interpreted broadly to include any suitable technique within the spirit and scope of the embodiments discussed herein.

In the following discussion, example environments are first described that are operable to employ resource access authorization techniques described herein. Example procedures involving resource access authorization techniques are then described which may be employed in the example environments as well as in other environments. Accordingly, the example environments are not limited to performing the example procedures. Likewise, the example procedures are not limited to implementation in the example environment. Finally, an example system and device are described that are operable to employ techniques discussed herein in accordance with one or more embodiments.

Example Environments

FIG. 1 is an illustration of an environment 100 in an example implementation that is operable to employ techniques for resource access authorization. Environment 100 includes a computing device 102 having one or more processors 104, one or more computer-readable storage media 106 and one or more applications 108 that reside on the computer-readable storage media 106 and which are executable by the processor 104. Computing device 102 can be embodied as any suitable computing device such as, by way of example and not limitation, a desktop computer, a portable computer, a handheld computer such as a personal digital assistant (PDA), mobile phone, tablet computer, and the like. One of a variety of different examples of a computing device 102 is shown and described below in FIGS. 7 and 8.

The computing device 102 of FIG. 1 is also illustrated as including a browser 110, e.g., a web browser, which is representative of functionality that is configured to navigate via a network 112. Although the network 112 is illustrated as the Internet, the network may assume a wide variety of configurations. For example, the network 112 may include a wide area network (WAN), a local area network (LAN), a wireless network, a public telephone network, an intranet, and so on. Further, although a single network 112 is shown, the network 112 may be configured to include multiple networks.

The browser 110, for instance, may be configured to navigate via the network 112 to interact with content available from one or more web resources 114 as well as communicate data to the one or more web resources 114, e.g., perform downloads and uploads. The web resources 114 may include any suitable computing resource that is configured to provide content that is accessible via the network 112. Examples of such content include web pages, text content, video, audio, and so on.

One or more of the applications 108 may also be configured to access the network 112, e.g., directly themselves and/or through the browser 110. For example, one or more of the applications 108 may be configured to access one or more of the web resources 114 to retrieve and/or upload content. Thus, the applications 108 may also be configured for a variety of functionality that may involve direct or indirect network 112 access. For instance, the applications 108 may include configuration settings and other data that may be leveraged locally by the application 108 as well as synchronized with applications that are executed on another computing device. In this way, these settings may be shared by the devices. A variety of other instances are also contemplated. Thus, the computing device 102 may interact with content in a variety of ways from a variety of different sources.

Further illustrated as part of the computing device 102 is an operating system 116 that is representative of functionality to manage resources of the computing device 102 and provide access to functionalities of the computing device 102. In implementations, the operating system 116 maintains identification information for the applications 108 that can be utilized to implement techniques discussed herein. For example, when one of the applications 108 is installed and/or initiated on the computing device 102, the computing device can record a system application identifier for the application. The system application identifier can be stored in a portion of the computing device 102 that is not accessible to and/or manipulable by the applications 108, such as a protected database, a kernel for the operating system 116, and so on. Additionally or alternatively, the system application identifier can be digitally signed such that the application cannot modify the identifier.

The computing device 102 in the illustrated example is also shown as including an access broker module 118 that is representative of functionality of the computing device 102 to mediate authorization and authentication transactions for the applications 108. The access broker module 118 is configured to communicate various forms of authorization and authentication information between entities involved in an authorization transaction. In implementations, the access broker module is configured to communicate information via browser functionality, and thus can be combined with and/or embodied as the browser 110.

Further to such authorization transactions, the environment 100 includes an authorization service 120 that is representative of functionality to track user profiles and to interact with the access broker module 118 to determine if the applications 108 and/or other entities are authorized to access user resources. For example, the authorization service 120 can be implemented as a web-based authorization service that can be accessed by multiple users and multiple different devices to conduct authorization and/or authentication transactions. In implementations, the authorization service 120 can maintain application identifiers for various applications, such as the applications 108. For example, the system application identifier discussed above for a particular one of the applications 108 can be communicated to the authorization service 120, e.g., as part of a registration of the application with the authorization service. The authorization service 120 can store the application identifiers to be used as part of the resource access operations discussed herein.

Further to such embodiments, the environment 100 includes user resources 122, which are representative of resources associated with a user of the computing device 102.

Examples of the user resources 122 include user content (e.g., images, audio, video, and so on), user data (e.g., files), user profiles for applications and/or services, and so on.

Although the authorization service 120 and the user resources 122 are illustrated as separate entities, in some implementations the user resources 122 can be managed and/or maintained by the authorization service 120. For example, the authorization service 120 can be associated with a type of content service that manages the user resources 122, such as a social networking service, a photo sharing service, a web log (blog) service, and so on. In such implementations, the authorization service 120 may be implemented to authenticate a user to a content service as well as to other services (e.g., the applications 108) that may interact with the content service.

In implementations, when the access broker module 118 determines that one of the applications 108 is authorized to access the user resources 122, the access broker module 118 provides an access token or other authorization mechanism to the application. The application can utilize the access token or other authorization mechanism to access the user resources 122. Thus, access token or other authorization mechanism can be employed to enable the applications 108 and/or other entities to access the user resources 122.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

For example, the computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Figure 2:
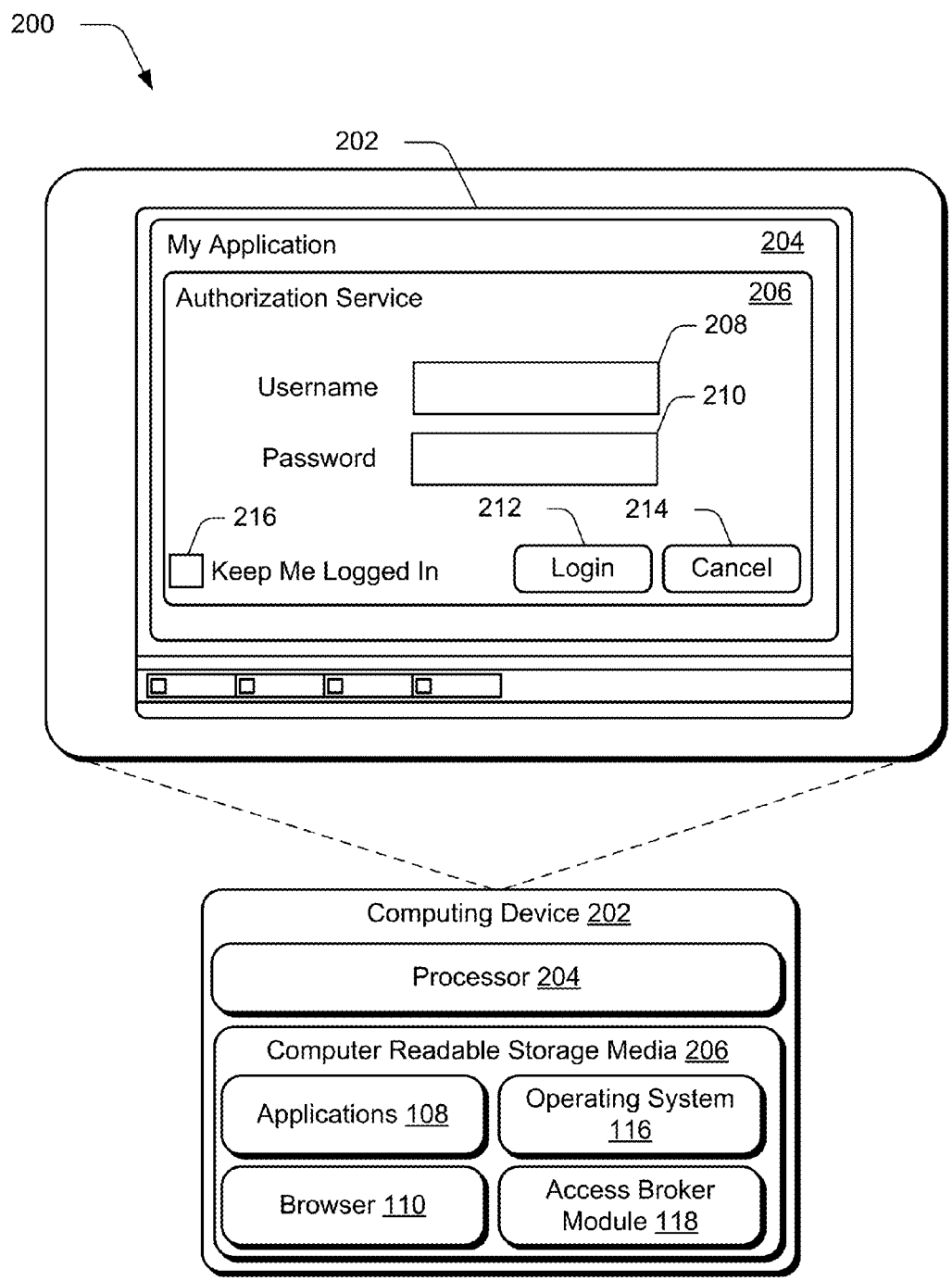
FIG. 2 is an illustration of an authorization environment in an example implementation that is operable to employ techniques discussed herein.

FIG. 2 illustrates an example authorization environment in accordance with one or more implementations, generally at 200. Included as part of the authorization environment 200 is a display screen 202 that can be included as part of the computing device 102. In implementations, the display screen 202 may or may not be configured to receive physical input, e.g., touch input or stylus input. Presented on the display screen 202 is an application user interface 204 that is associated with an application, e.g., the application 108.

To enable a user to provide authorization for an application to access user resources, an authorization user interface 206 is provided. In implementations, the authorization user interface 206 can be displayed automatically, e.g., in response to the application 108 being opened. For example, when a user initiates the application 108, the access broker module 118 can communicate with the browser 110 and/or the authorization service 120 to cause the authorization user interface 206 to be displayed. For instance, the authorization service 120 can provide the authorization user interface 206 to the web browser 110, e.g., as a web page. Alternatively or additionally, a user can cause the authorization user interface 206 to be launched by selecting a login button or other control (not illustrated) associated with the application user interface 204.

In implementations, the authorization user interface 206 can be modal with respect to the application user interface 204. For example, the application user interface 204 can be prevented from receiving input and/or being closed until the authorization user interface 206 is dismissed, e.g., in response to user input to the authorization interface.

Illustrated as part of the authorization user interface 206 is a username field 208 and a password field 210. The username field 208 is configured to receive a username and/or other identifying indicia (e.g., a user email) from a user. Additionally, the password field 210 is configured to receive a password from a user. In implementations, a username and password are associated with a user profile for a user, e.g., a user profile that is previously established with the authorization service 120. Thus, providing a username and a password to the authorization user interface 206 can authenticate a user as being authorized to access a particular user profile and/or user resources associated with the user profile.

Further illustrated as part of the authorization user interface 206 is a login control 212 that, if selected, submits login information provided to the authorization user interface 206. For example, a username provided to the username field 208 and a password provided to the password field 210 can be submitted to the authorization service 120 in response to a selection of the login control 212.

The authorization user interface 206 also includes a cancel control 214 that, if selected, can cause an authorization transaction to be cancelled and/or the authorization user interface 206 to be closed.

Further included as part of the authorization user interface 206 is a persisted login option 216 that is selectable to activate a persisted authentication mode. In implementations, the persisted authentication mode can be activated by a user (e.g., via selection of the persisted login option 216) and/or by another entity, such as the application 108 and/or the access broker module 118. Further details regarding the persisted authentication mode are discussed in more detail above and below.

Having described example environments in which the techniques described herein may operate, consider now a discussion of some example procedures in accordance with one or more embodiments.

Example Procedures

The following discussion describes resource access authorization techniques that may be implemented utilizing the systems and devices described herein. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. Further, an operation shown with respect to a particular procedure may be combined and/or interchanged with an operation of a different procedure in accordance with one or more implementations. In portions of the following discussion, reference will be made to the environments 100 and/or 200 of FIGS. 1 and 2.

Figure 3:
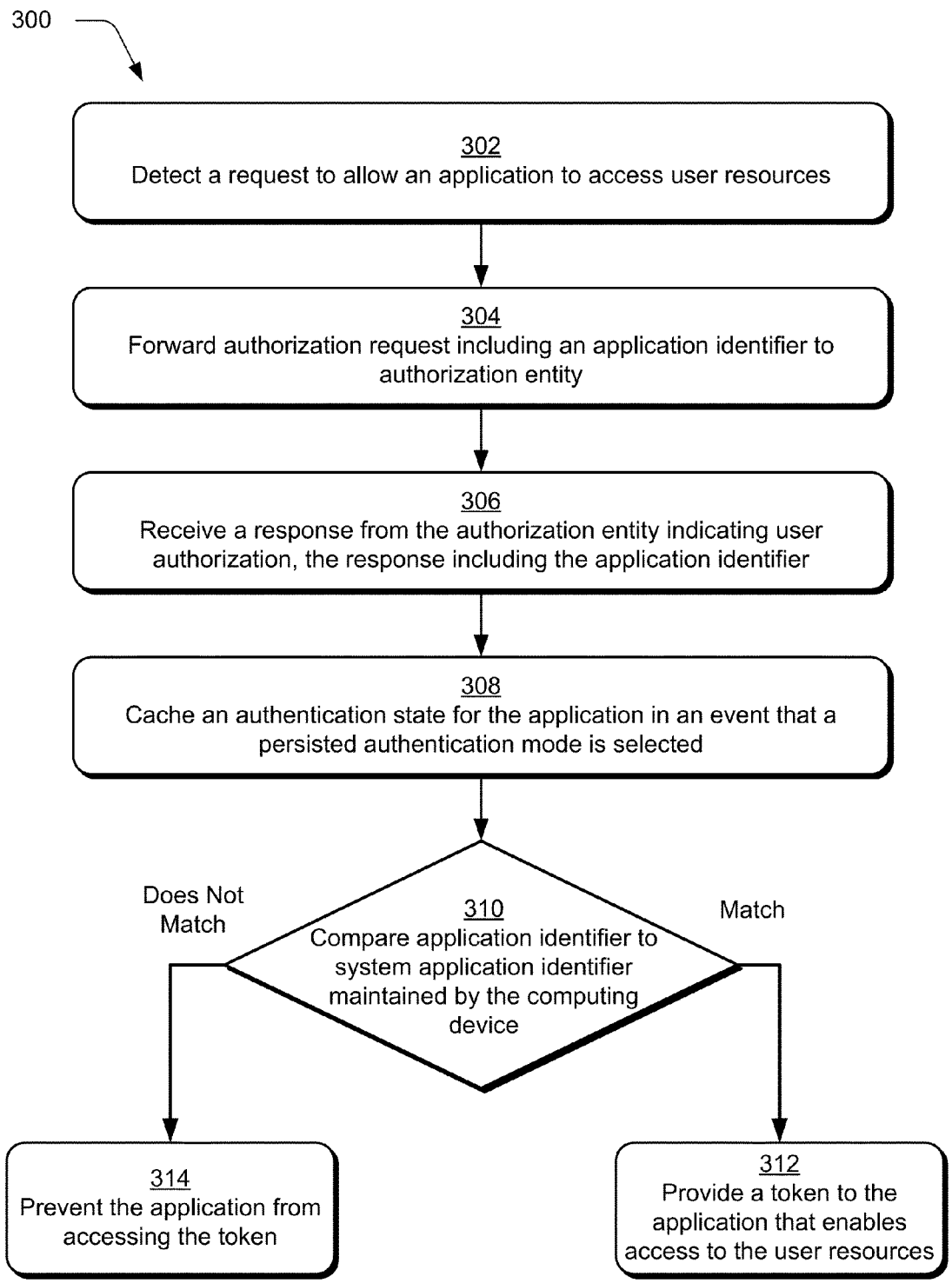
FIG. 3 is a flow diagram depicting a procedure in an example implementation in which a user can authorize an application to access user resources.

FIG. 3 depicts a procedure 300 in an example implementation in which a user can authorize an application to access user resources. Step 302 detects a request to allow an application to access user resources. For example, the access broker module 118 can receive a request from the application 108 for access to the user resources 122. Alternatively or additionally, the request can be received from an entity other than the application prior to the application initiating a request to access the user resources. For example, an entity can obtain permission in advance for the application to access the user resources. In implementations, portions of the computing device 102 and/or the browser 110 can store user identification information, such as logon information, authentication and/or authorization cookies, usernames, passwords, and so on. To prevent the application 108 from gaining unauthorized access to such identification information, the access broker module 118 can clear the identification information from portions of the computing device 102 that are accessible to the application 108, e.g., in response to receiving the request from the application.

Step 304 forwards an authorization request including an application identifier to an authorization entity. For example, the access broker module 118 can communicate with the browser 110 to cause the authorization request to be forwarded from the browser to the authorization service 120. In implementations, the authorization request can include a uniform resource locator (URL) for the authorization service 120 that includes the application identifier and a redirect address (e.g., a uniform resource identifier (URI)) that can be used to return information to the application. One example of such a URL can be "https://www.authozationservice.com/requestAccess.html?applicationID=X&redirectAddress=http://redirect.com".

In implementations, the authorization service 120 receives the authorization request and causes the authorization user interface 206 to be presented via the browser 110. A user can then provide authentication information to the authorization user interface 206, e.g., a username and password. Additionally or alternatively, the user can provide consent for the application to access the user resources, e.g., via the authorization user interface 206.

Step 306 receives a response from the authorization entity indicating user authorization, the response including the application identifier. For example, authentication information provided to the authorization user interface 206 is submitted to the authorization service 120, which determines that the authentication information matches a user profile known to the authorization service. The authorization service 120 sends a reply to the authorization request to the access broker module 118. In implementations, the reply includes the application identifier and can include additional information, such as an access token that can be utilized to access user resources.

Step 308 caches an authentication state for the application in an event that a persisted authentication mode is selected. For example, a user can select the persisted authentication mode, e.g., via the authorization user interface 206 as part of providing user credentials. If the persisted authentication state is selected, the authentication state is cached, e.g., by the access broker module 118. A cached authentication state can include authentication and other information that enables an application to access user resources during a subsequent request for access to user resources without requiring a user to perform further authentication. Further aspects of the persisted authentication mode are discussed below. If the persisted authentication mode is not selected, an authentication state is not cached for subsequent use and/or a user may be requested for authentication as part of a subsequent resource access request.

Step 310 compares the application identifier received from the authorization entity to a system application identifier maintained by the computing device. For example, the system application identifier can be a unique identifier that differentiates the application from other applications and/or resources of the computing device. Further discussion of the system application identifier is presented above.

If the application identifier received from the authorization entity matches the system application identifier ("Match"), step 312 provides a token to the application that enables access to the user resources. In implementations, the access broker module 118 can receive the token from the authorization service 120 and forward the token to the application 108. The application 108 can use the token to access user resources. If the application identifier received from the authorization entity does not match the system application identifier ("Does Not Match"), step 314 prevents the application from accessing the token. Thus, the application may not access the user resources since access to the user resources can be limited to applications that present the token.

Figure 4:
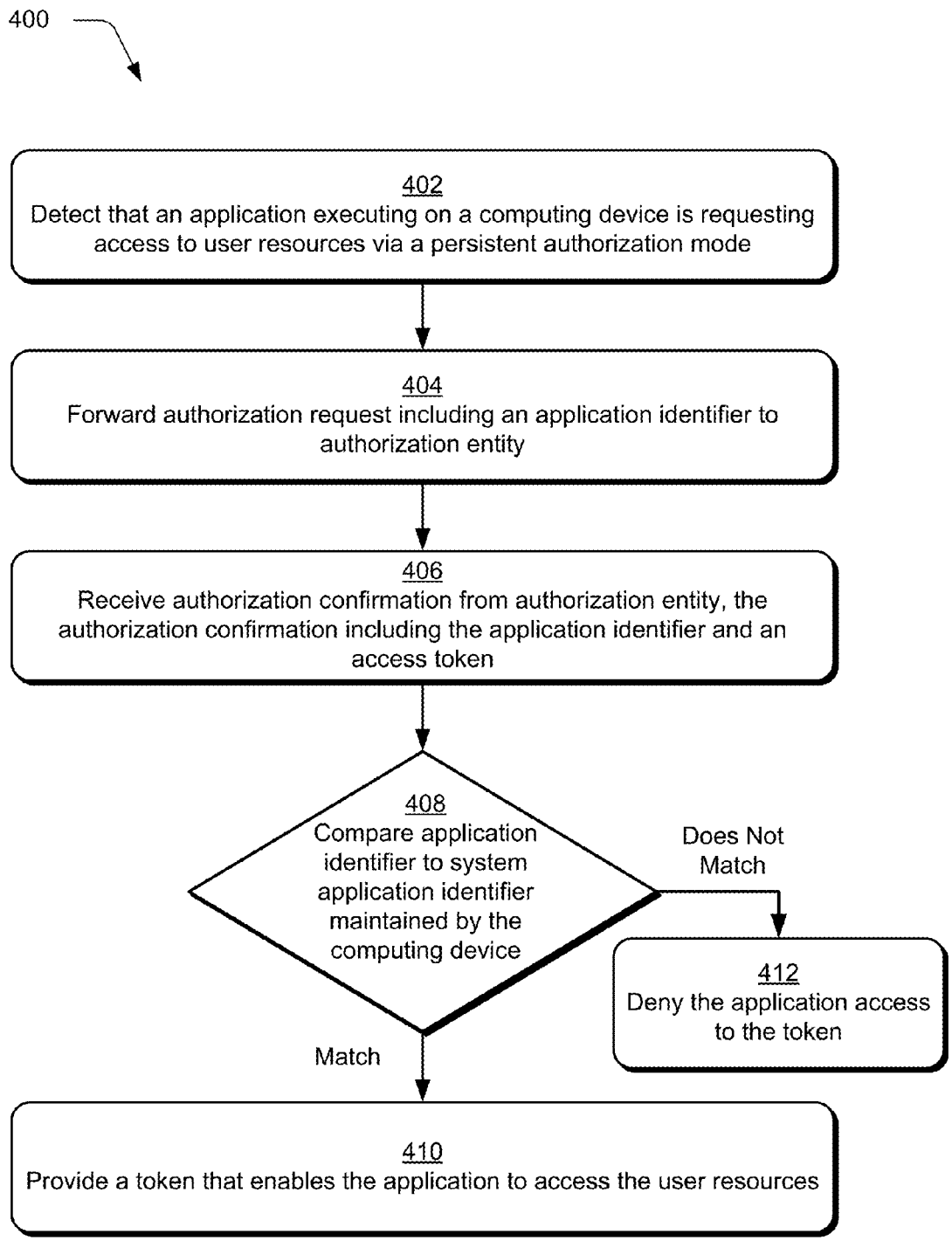
FIG. 4 is a flow diagram depicting a procedure in an example implementation in which a persisted authentication mode is utilized for resource access.

FIG. 4 depicts a procedure 400 in an example implementation in which a persisted authentication mode is utilized for user resource access. According to one or more embodiments, the procedure 400 can be performed as part of a resource access request subsequent to that discussed above in FIG. 3.

Step 402 detects that an application executing on a computing device is requesting access to user resources via a persisted authentication mode. Example ways of initiating a persisted authentication mode are discussed above. Step 404 forwards an authorization request including an application identifier to an authorization entity. For example, the access broker module 118 can receive the authorization request from the application and forward the cached authentication state information discussed above to the authorization service 120.

In implementations, the authorization request can include a custom uniform resource identifier (URI) scheme that indicates that the persisted authentication mode is being used. For example, a URL that is used to navigate to the authorization service 120 (an example of which is discussed above) can be appended with the custom URI scheme. The custom URI scheme can include the application identifier and indicia that is specific to the persisted authentication mode, e.g., "persisted://application_id". In implementations, the access broker module 118 can stipulate that the custom URI scheme be utilized by an application for the persisted authentication scheme to be implemented for the application.

Step 406 receives an authorization confirmation from the authorization entity, the authorization confirmation including the application identifier and an access token. In implementations, the authorization confirmation can be receive based at least in part on a user providing authorization for the application to access the user resources, e.g., via an authorization prompt provided by the authorization entity. The authorization entity can discern (e.g., based on the application identifier from the authorization request) that the authorization request is from an application that is authorized to access user resources. For example, the application may have been previously authorized to access user resources via user interaction with the authorization entity. Further to such implementations, the authorization entity can return the custom URI provided as part of the authorization request to the access broker module 118 along with an access token appended to the custom URI.

Step 408 compares the application identifier to a system application identifier for the application maintained by the computing device. Details regarding matching application identifiers are presented above. If the application identifier received from the authorization entity matches the system application identifier ("Match"), step 410 provides a token that enables the application to access the user resources. For example, the access broker module 118 can receive an authentication token from the authorization service 120, and can provide the authentication token to the application 108. The application 108 can use the authentication token to access the user resources 122.

If the application identifier received from the authorization entity does not match the system application identifier ("Does Not Match"), step 412 denies the application access to the token.

Thus, in implementations the persisted authentication mode enables a determination whether an application is authorized to access user resources to be made independent of a user authentication transaction and/or user interaction, e.g., with an authorization service.

Figure 5:
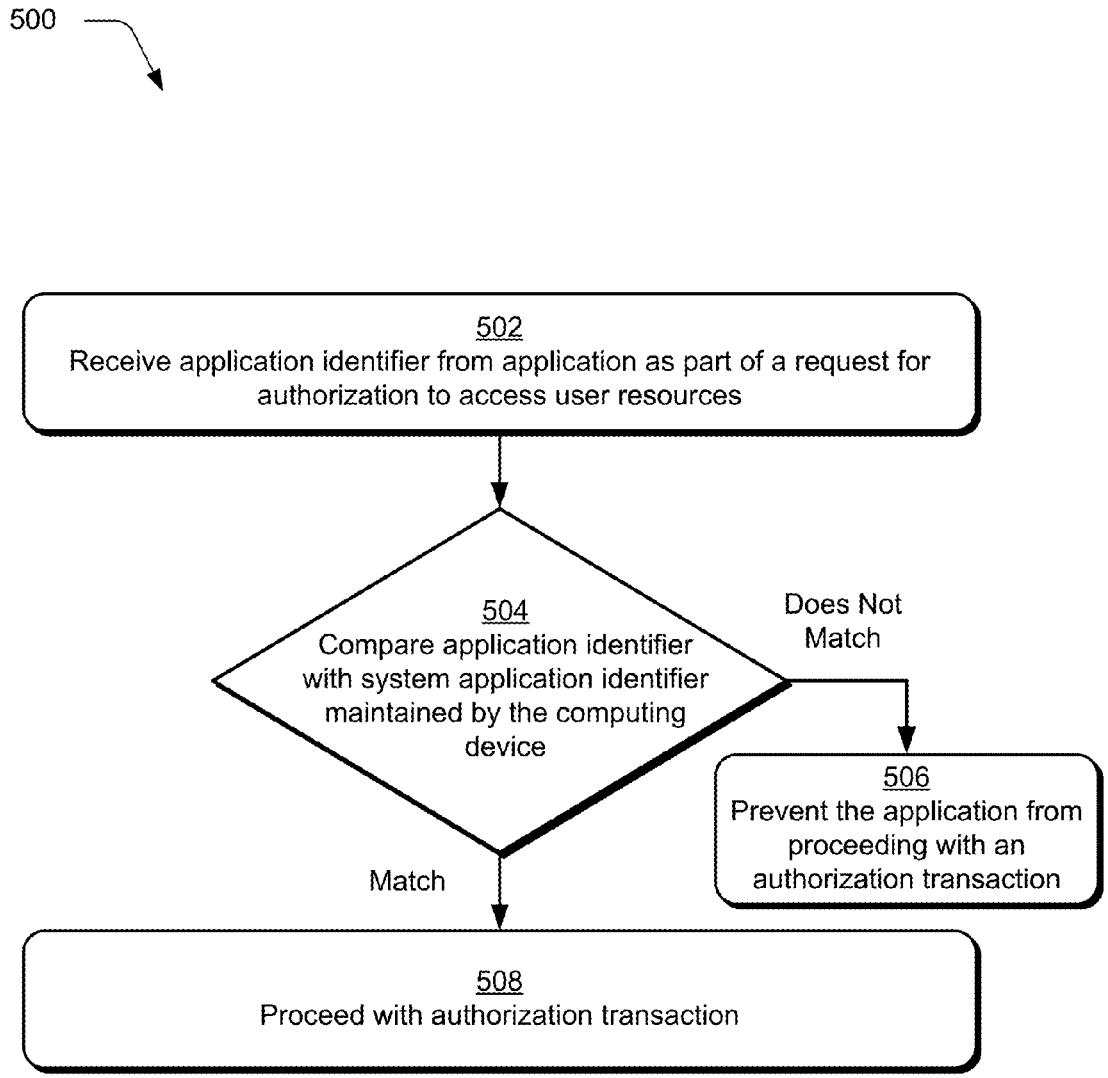
FIG. 5 is a flow diagram depicting a procedure in an example implementation in which an application is validated to participate in an authorization transaction.

FIG. 5 depicts a procedure 500 in an example implementation in which a determination is made whether an application may participate in an authorization transaction. Step 502 receives an application identifier from an application as part of a request to access user resources. Step 504 compares the application identifier with a system application identifier for the application maintained by the computing device. Details regarding matching application identifiers are presented above. In implementations, the access broker module 118 can receive the application identifier from the application and query the operating system 116 for a system application identifier for the application. The access broker module 118 can then compare the application identifier with the system application identifier to determine whether they match.

If the application identifier received from the application does not match the system application identifier ("Does Not Match"), step 506 prevents the application from proceeding with an authorization transaction. If the application identifier received from the application does match the system application identifier ("Match"), step 508 proceeds with an authorization transaction. Example authorization transactions are discussed elsewhere herein with reference to FIGS. 3, 4, and 6.

Figure 6:
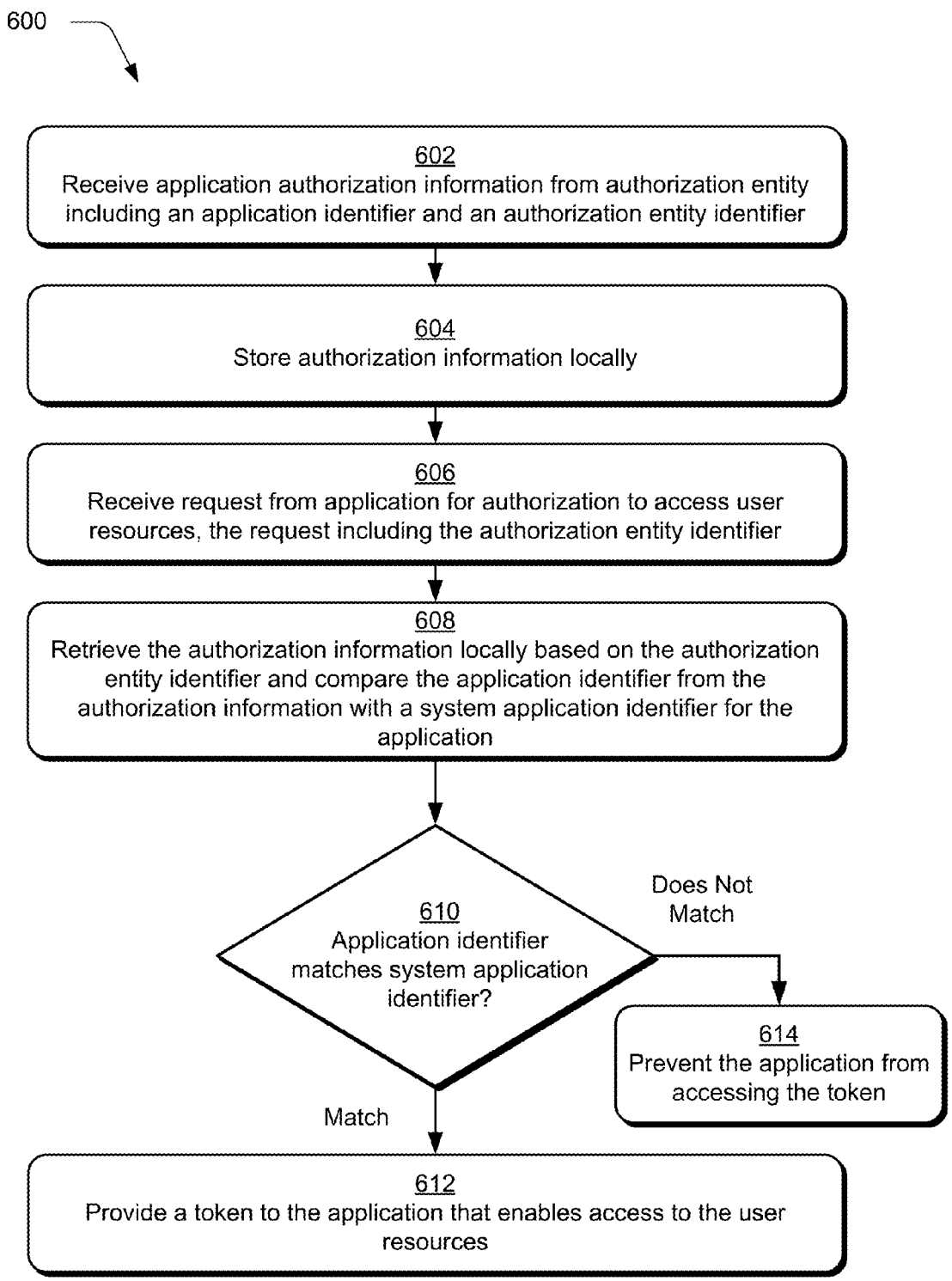
FIG. 6 is a flow diagram depicting a procedure in an example implementation in which local authorization information is used to determine if an application is authorized to access user resources.

FIG. 6 depicts a procedure 600 in an example implementation in which local authorization information is used to determine if an application is authorized to access user resources. Step 602 receives application authorization information from an authorization entity, including an application identifier and an authorization entity identifier. For example, the authorization information can be received from the authorization service 120 in response to a user authenticating with the authorization service and providing permission for the application to access the user resources 122. Examples ways of providing user authentication and user permission are discussed above. In implementations, the authorization entity identifier enables other entities (e.g., the access broker module 118) to identify from which authorization entity the authorization information was received.

Step 604 stores the authorization information locally. In implementations, the authorization information can be stored by the access broker module 118 and/or in a location accessible to the access broker module. Step 606 receives a request from an application for authorization to access user resources, the request including the authorization entity identifier. For example, the access broker module 118 can receive the request from the application 108.

Step 608 retrieves the authorization information locally based on the authorization entity identifier received from the application and compares the application identifier from the authorization information with a system application identifier for the application. Example ways of comparing an application identifier and a system application identifier are discussed above. Step 610 determines whether the application identifier matches the system application identifier.

If the application identifier matches the system application identifier ("Match"), step 612 provides a token to the application that enables access to the user resources. If the application identifier does not match the system application identifier ("Does Not Match"), step 614 prevents the application from accessing the token.

In implementations, the procedure 600 illustrates an example technique whereby authorization for an application to access user resources can be determined without requiring communication with an authorization service at application runtime. For example, a user can interact with an authorization service to authorize an application to access user resources. Information from the user authorization transaction can then be stored for subsequent retrieval, e.g., as discussed in steps 602 and 604, above. Further to a subsequent request from the application for access to the user resources, the access broker module 118 can use the locally-stored authorization information to determine, without communicating with the authorization service, whether to allow the application to access the user resources.

In at least some embodiments, an application can maintain a persisted authorization mode, which differs in one or more respects from the persisted authentication mode discussed above. For example, an application can maintain a token that enables the application to access user resources, such as a token received via the techniques discussed above. The token can enable access to user resources during multiple different resource access transactions, e.g., in response to multiple different requests from the application for access to user resources. When the application is seeking to access user resources using the token, the application can ascertain whether the token has expired such that it is no longer effective to enable access to the user resources. If the token has expired, the application can use the techniques discussed above to obtain a new, valid token, such as from the access broker module 118 and/or the authorization service 120. Thus, in implementations the persisted authorization mode can enable an application to access user resources during multiple resource access transactions without requiring the application to request the access, e.g., via the access broker module 118 and/or the authorization service 120.

Example System and Device

Figure 7:
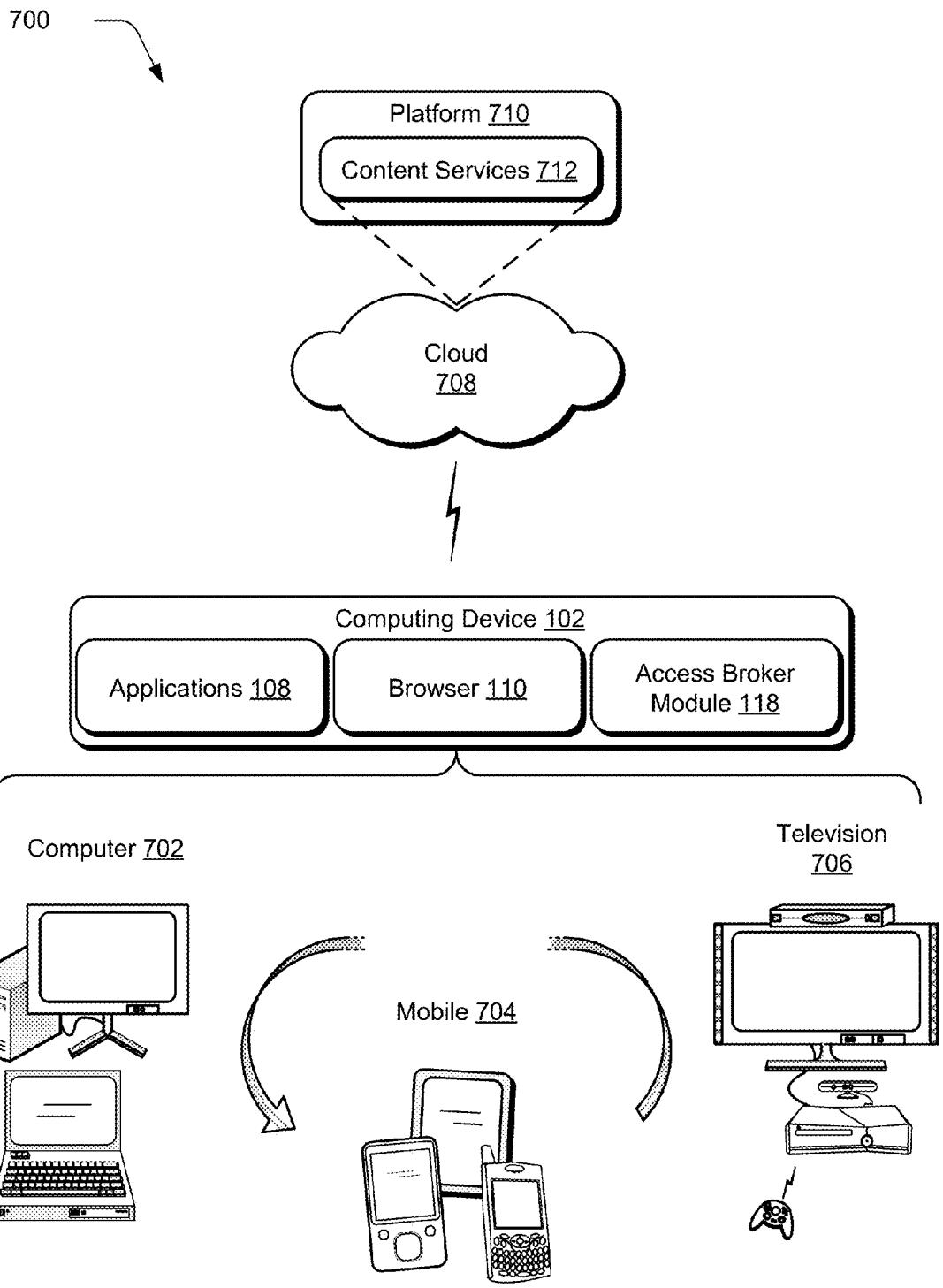
FIG. 7 illustrates an example system that includes the computing device as described with reference to FIGS. 1, 2, and 8.

FIG. 7 illustrates an example system 700 that includes the computing device 102 as described with reference to FIGS. 1 and 2. The example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link. In one or more embodiments, this interconnection architecture enables functionality to be delivered across multiple devices to provide a common and seamless experience to a user of the multiple devices. Each of the multiple devices may have different physical attributes and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 702, mobile 704, and television 706 uses. Each of these configurations includes devices that may have generally different constructs and capabilities, and thus the computing device 102 may be configured according to one or more of the different device classes. For instance, the computing device 102 may be implemented as the computer 702 class of a device that includes a personal computer, desktop computer, a multi-screen computer, laptop computer, netbook, and so on.

The computing device 102 may also be implemented as the mobile 704 class of device that includes mobile devices, such as a mobile phone, portable music player, portable gaming device, a tablet computer, a multi-screen computer, and so on. The computing device 102 may also be implemented as the television 706 class of device that includes devices having or connected to generally larger screens in casual viewing environments. These devices include televisions, set-top boxes, gaming consoles, and so on. The techniques described herein may be supported by these various configurations of the computing device 102 and are not limited to the specific examples the techniques described herein.

The cloud 708 includes and/or is representative of a platform 710 for content services 712. The platform 710 abstracts underlying functionality of hardware (e.g., servers) and software resources of the cloud 708. The content services 712 may include applications and/or data that can be utilized while computer processing is executed on servers that are remote from the computing device 102. Content services 712 can be provided as a service over the Internet and/or through a subscriber network, such as a cellular or Wi-Fi network.

The platform 710 may abstract resources and functions to connect the computing device 102 with other computing devices. The platform 710 may also serve to abstract scaling of resources to provide a corresponding level of scale to encountered demand for the content services 712 that are implemented via the platform 710. Accordingly, in an interconnected device embodiment, implementation of functionality described herein may be distributed throughout the system 700. For example, the functionality may be implemented in part on the computing device 102 as well as via the platform 710 that abstracts the functionality of the cloud 708, as shown through inclusion of the applications 108, the browser 110, and the access broker module 118.

Figure 8:
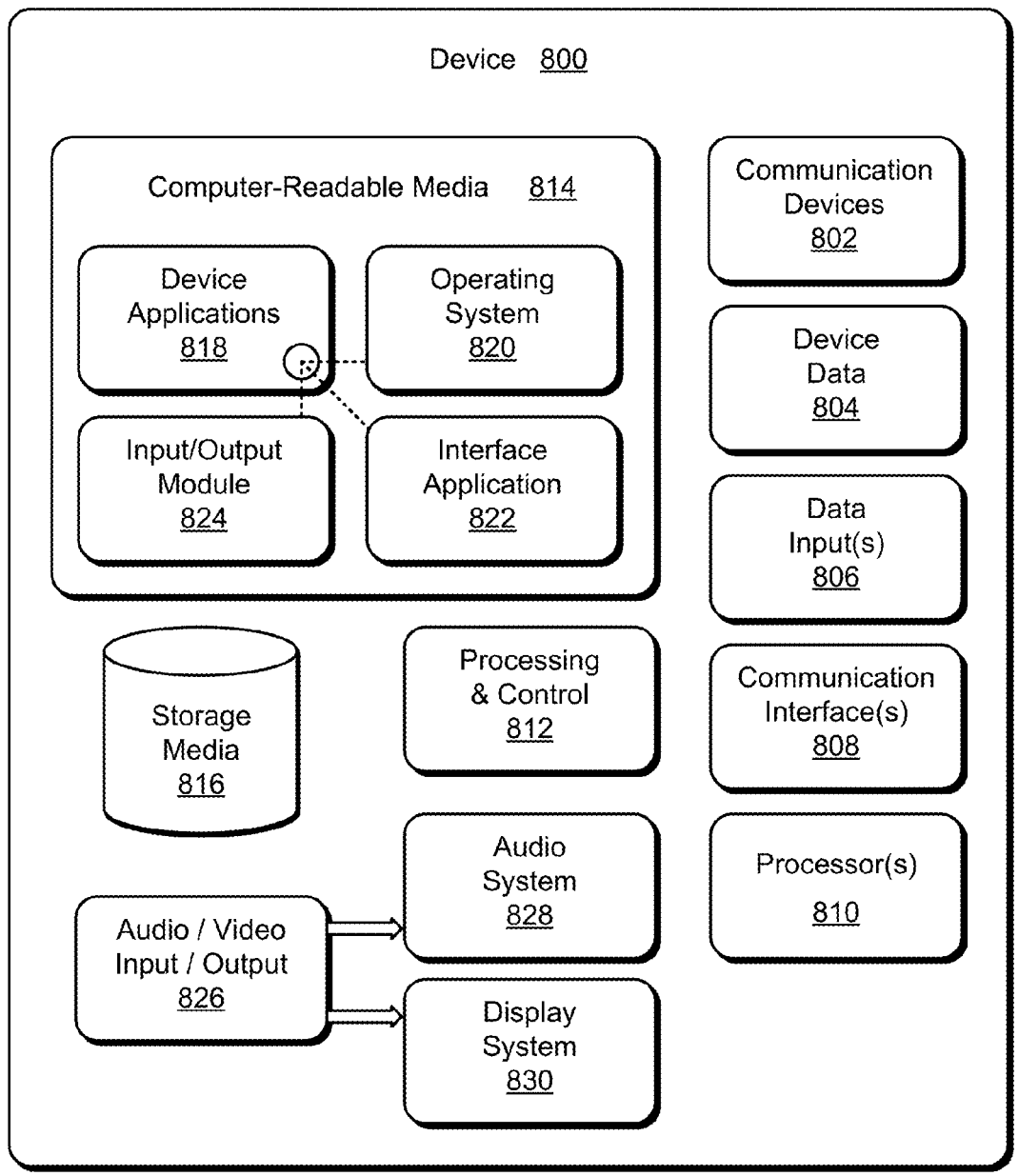
FIG. 8 illustrates various components of an example device that can be implemented as any type of portable and/or computer device as described with reference to FIGS. 1, 2, and 7 to implement embodiments of the techniques described herein.

FIG. 8 illustrates various components of an example device 800 that can be implemented as any type of computing device as described with reference to FIGS. 1 and 7 to implement embodiments of the techniques described herein. Device 800 includes communication devices 802 that enable wired and/or wireless communication of device data 804 (e.g., received data, data that is being received, data scheduled for broadcast, data packets of the data, etc.). The device data 804 or other device content can include configuration settings of the device, media content stored on the device, and/or information associated with a user of the device. Media content stored on device 800 can include any type of audio, video, and/or image data. Device 800 includes one or more data inputs 806 via which any type of data, media content, and/or inputs can be received, such as user-selectable inputs, messages, music, television media content, recorded video content, and any other type of audio, video, and/or image data received from any content and/or data source.

Device 800 also includes communication interfaces 808 that can be implemented as any one or more of a serial and/or parallel interface, a wireless interface, any type of network interface, a modem, and as any other type of communication interface. The communication interfaces 808 provide a connection and/or communication links between device 800 and a communication network by which other electronic, computing, and communication devices communicate data with device 800.

Device 800 includes one or more processors 810 (e.g., any of microprocessors, controllers, and the like) which process various computer-executable instructions to control the operation of device 800 and to implement embodiments of the techniques described herein. Alternatively or in addition, device 800 can be implemented with any one or combination of hardware, firmware, or fixed logic circuitry that is implemented in connection with processing and control circuits which are generally identified at 812. Although not shown, device 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 800 also includes computer-readable media 814, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 800 can also include a mass storage media device 816.

Computer-readable media 814 provides data storage mechanisms to store the device data 804, as well as various device applications 818 and any other types of information and/or data related to operational aspects of device 800. For example, an operating system 820 can be maintained as a computer application with the computer-readable media 814 and executed on processors 810. The device applications 818 can include a device manager (e.g., a control application, software application, signal processing and control module, code that is native to a particular device, a hardware abstraction layer for a particular device, etc.). The device applications 818 also include any system components or modules to implement embodiments of the techniques described herein.

In this example, the device applications 818 include an interface application 822 and an input/output module 824 that are shown as software modules and/or computer applications. The input/output module 824 is representative of software that is used to provide an interface with a device configured to capture inputs, such as a touchscreen, track pad, camera, microphone, and so on. Alternatively or in addition, the interface application 822 and the input/output module 824 can be implemented as hardware, software, firmware, or any combination thereof. Additionally, the input/output module 824 may be configured to support multiple input devices, such as separate devices to capture visual and audio inputs, respectively.

Device 800 also includes an audio and/or video input-output system 826 that provides audio data to an audio system 828 and/or provides video data to a display system 830. The audio system 828 and/or the display system 830 can include any devices that process, display, and/or otherwise render audio, video, and image data. Video signals and audio signals can be communicated from device 800 to an audio device and/or to a display device via an RF (radio frequency) link, S-video link, composite video link, component video link, DVI (digital video interface), analog audio connection, or other similar communication link. In an embodiment, the audio system 828 and/or the display system 830 are implemented as external components to device 800. Alternatively, the audio system 828 and/or the display system 830 are implemented as integrated components of example device 800.

CONCLUSION

Techniques for resource access authorization are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:
one or more processors; and
one or more computer-readable storage media storing computer-executable instructions that are executable by the one or more processors to perform operations including:
receiving a request from an application for access to a user resource, the request being appended with a uniform resource identifier (URI) that includes a custom URI scheme that identifies a persisted authentication mode and that includes an application identifier for the application;
forwarding an authorization request to an authorization entity responsive to receiving the request, the authorization request including the application identifier for the application;
receiving a response from the authorization entity indicating that the application is permitted to access the user resource, the response including the application identifier for the application;
checking whether a user has selected a persisted authentication mode for the application;
caching an authentication state for the application in an event that an indication is received that the persisted authentication mode has been selected; and
providing a token to the application that enables access to the user resource if the application identifier matches a system application identifier obtained from a storage portion of a computing device on which the application is executing, the storage portion of the computing device being inaccessible to the application.

2. A system as described in claim 1, wherein said user resource comprises one or more of user content, user data, or user profile information.

3. A system as described in claim 1, wherein said authorization request includes a redirect uniform resource identifier (URI) that identifies the application and that is forwarded to the authorization entity to be used to return the application identifier.

4. A system as described in claim 1, wherein said authorization request occurs in the persisted authentication mode that enables the application to be authorized to access the user resource independent of user authentication with the authorization entity.

5. A system as described in claim 1, wherein said authorization entity comprises a service that is implemented remotely from the computing device.

6. A system as described in claim 1, wherein the operations further include obtaining said system application identifier by signing the system application identifier such that it cannot be modified by the application.

7. A system as described in claim 1, wherein said token is usable to access the user resource as part of one or more subsequent requests to access the user resource.

8. A system as described in claim 7, wherein the operations further include requesting a new token in response to an indication that the token has expired.

9. One or more computer-readable storage devices comprising instructions stored thereon that, responsive to execution by a computing device, cause the computing device to perform operations comprising:
maintaining a cached authentication state for an application that can be used to enable the application to access a user resource;
receiving a request from the application to allow the application to access the user resource;
clearing user identification information from a portion of the computing device that is accessible to the application in response to detecting the request from the application to allow the application to access the user resource, said clearing performed prior to determining whether to allow the application to access the user resource;
forwarding one or more portions of the cached authentication state to an authorization service in response to the request to allow the application to access the user resource;
receiving an application identifier from the authorization service; and
determining whether to provide a token to the application that enables access to the user resource by comparing the application identifier received from the authorization service with a system application identifier for the application obtained from a storage portion of the computing device that is inaccessible to the application.

10. One or more computer-readable storage devices as recited in claim 9, wherein said token includes one or more of an authentication token or a user identification cookie.

11. One or more computer-readable storage devices as recited in claim 9, wherein said application identifier is received from the authorization service in response to a user authenticating with the authorization service to indicate that the application is permitted to access the user resource.

12. One or more computer-readable storage devices as recited in claim 9, wherein said comparing occurs at an application runtime for the application and independent of interaction with the authorization service.

13. One or more computer-readable storage devices as recited in claim 9, wherein the portion of the computing device that is inaccessible to the application comprises an operating system kernel of the computing device.

14. One or more computer-readable storage devices as recited in claim 9, wherein the operations comprise preventing the application from accessing the token if the application identifier does not match the system application identifier.

15. One or more computer-readable storage devices as recited in claim 9, wherein the operations comprise:
    in response to the request from the application, causing an authorization user interface associated with the authorization service to be presented, the authorization user interface being configured to receive user authentication information from a user; and
    receiving the application identifier from the authorization service based on the user authenticating with the authorization service via the authorization user interface.

16. A computer-implemented method, comprising:
    receiving a request from an application executing on a computing device for access to a user resource, the request being appended with a uniform resource identifier (URI) that includes a custom URI scheme that identifies a persisted authentication mode;
    detecting that the application is requesting access to the user resource via the persisted authentication mode by recognizing that the URI received with the request identifies the persisted authentication mode;
    clearing user identification information from a portion of the computing device that is accessible to the application in response to said detecting;
    communicating an authorization request to an authorization service to ascertain whether the application is permitted to access the user resource;
    receiving a response from the authorization service indicating whether the application is permitted to access the user resource, the response including an application identifier for the application;
    determining whether the application identifier received from the authorization service matches a system application identifier obtained from a storage portion of the computing device that is inaccessible to the application; and
    in an event that the application identifier matches the system application identifier, providing a token to the application that enables the application to access the user resource.

17. A computer-implemented method as described in claim 16, wherein said persisted authentication mode enables a determination as to whether the application is allowed to access the user resource to be made during multiple authorization transactions independent of a user authentication with the authorization service.

18. A computer-implemented method as described in claim 16, wherein the request further includes a redirect URI that identifies the application to be used by the authorization service to return the application identifier.

19. A computer-implemented method as described in claim 16, wherein said authorization service is included as part of a content service that manages access to the user resource.

20. A computer-implemented method as described in claim 16, wherein the URI is configured with an identifier for the persisted authentication mode in response to receiving an indication of a user selection of the persisted authentication mode.

* * * * *